United States Patent
Hattar et al.

(10) Patent No.: US 10,167,796 B2
(45) Date of Patent: Jan. 1, 2019

(54) GASOLINE PARTICULATE FILTER REGENERATION STRATEGY

(71) Applicant: GM Global Technology Operations LLC, Detroit, MI (US)

(72) Inventors: Rafat F. Hattar, Royal Oak, MI (US); Alexander Michel, Rheinböllen (DE); Simon Schiesser, Mainz (DE); Nils Oth, Armstadt (DE); Markus Kraft, Bad Camberg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 6 days.

(21) Appl. No.: 15/597,625

(22) Filed: May 17, 2017

(65) Prior Publication Data

US 2018/0334977 A1 Nov. 22, 2018

(51) Int. Cl.

| | |
|---|---|
| *F01N 3/023* | (2006.01) |
| *F02D 41/02* | (2006.01) |
| *F01N 3/021* | (2006.01) |
| *F01N 9/00* | (2006.01) |
| *F01N 11/00* | (2006.01) |
| *F02D 37/02* | (2006.01) |
| *F02D 41/04* | (2006.01) |

(52) U.S. Cl.
CPC .......... *F02D 41/029* (2013.01); *F01N 3/021* (2013.01); *F01N 9/002* (2013.01); *F01N 11/002* (2013.01); *F02D 37/02* (2013.01); *F02D 41/042* (2013.01); *F01N 2560/06* (2013.01); *F02D 2200/101* (2013.01)

(58) Field of Classification Search
CPC ............................... F02D 41/029; F01N 9/002
See application file for complete search history.

(56) References Cited

U.S. PATENT DOCUMENTS

| | | | |
|---|---|---|---|
| 2011/0072788 A1* | 3/2011 | Ruona | F01N 3/023 60/276 |
| 2011/0073088 A1* | 3/2011 | Hubbard | F01N 3/021 123/703 |
| 2017/0159522 A1* | 6/2017 | Ma | F01N 9/002 |

* cited by examiner

*Primary Examiner* — Jonathan Matthias

(57) ABSTRACT

The method determines whether soot loading of a gas particulate filter (GPF) requires regeneration. If it does, the temperature of the GPF is read to determine whether it is sufficiently high to achieve particulate (soot) burning. If it is not, an engine control module is commanded to adjust variables such as spark timing, fuel injection timing and valve timing. If the temperature of the particulate filter is sufficiently high that regeneration can occur, other variables may be adjusted such as leaning the air/fuel mixture, retarding the spark timing, the fuel injection and valve timing. Because the latter adjustments may limit or reduce either engine speed or power, messages in a message center are provided indicating, first, that the driver should continue driving for GPF regeneration and, subsequently, under certain conditions, that the engine power has been reduced. Operation of the motor vehicle proceeds until, based upon sensed conditions or pre-determined experimental or empirical data, the filter has been regenerated.

19 Claims, 3 Drawing Sheets

GASOLINE PARTICULATE FILTER REGENERATION STRATEGY

FIELD

The present disclosure relates to a regeneration strategy for a gasoline particulate filter (GPF) for gasoline fueled motor vehicles and more particularly to a regeneration strategy for a heavily loaded gasoline particulate filter for an internal combustion engine in a gasoline fueled motor vehicle.

BACKGROUND

The statements in this section merely provide background information related to the present disclosure and may or may not constitute prior art.

Increasingly stringent emissions standards continue to present challenges for automobile and motor vehicle engineers and designers throughout the world. For example, new Euro 6d and China 6 particulate emission limits reduced previous particulate number (PN) limits by a factor of ten. This new standard is $6\times10^{11}$ particles per kilometer.

While port fuel injected (PFI) gasoline engines can generally meet this standard, the industry is increasingly moving to gasoline direct injected (GDI) engines for which such limits represent a significant challenge.

One of the currently accepted solutions to bringing gasoline direct injected engines into conformance with the Euro 6d and China 6 particulate emission limits envisions the use of a gasoline particulate filter (GPF). As the name suggests, in its most basic configuration, a gasoline particulate filter is simply a filter disposed in the exhaust system of the gasoline fueled engine in which particulate matter is trapped and accumulates.

Because any such particulate filter will be of finite size and thus capable of collecting and retaining only a finite amount of particulate matter from the exhaust of the internal combustion engine, the question rather quickly arises of how the filter is purged or regenerated.

It has been determined that a certain amount of oxygen in the exhaust will purge or regenerate the filter if it is at a sufficiently high temperature. Because gasoline internal combustion engines ideally operate at (or very near) a stoichiometric ratio, there is typically little, if any, oxygen in the exhaust during normal, at least partially loaded, operation. However, passive regeneration is possible during fuel cutoff when the amount of oxygen in the exhaust increases, which occurs during a vehicle coast down, but, again, only if it is at a sufficiently high temperature. Accordingly, if the vehicle is utilized for very short trips or operated for short trips in cold weather, the exhaust system and specifically the particulate filter may not reach a passive, self-regenerating temperature, precluding such regeneration.

SUMMARY

The present disclosure provides for active regeneration of a gasoline particulate filter (GPF) when passive regeneration of the filter has not maintained a sufficiently low level of soot loading in the filter. The method, which may be embodied in an algorithm and software, first determines whether a condition requiring regeneration, such as soot loading, is met. If it is, then it is determined whether a forced regeneration is necessary. If it is, the amount of soot in the filter is determined and it is determined whether the engine is operating under speed and load conditions that preclude regeneration. The temperature of the particulate filter is read to determine whether it is at a sufficiently high temperature to achieve particulate (soot) burning. If it is not, a control module (ECM) is commanded to adjust variables such as spark timing, fuel injection timing, valve timing, to inhibit the fuel cutoff or to inhibit the engine start-stop (ESS) feature. If the temperature of the particulate filter is sufficiently high that regeneration (soot burning) can occur other variables may be adjusted such as leaning the air/fuel mixture, retarding the spark timing, adjusting the fuel injection and valve timing, enabling the fuel cut-off and inhibiting the engine start-stop (ESS) feature. Depending on the soot level, indicator lights on the instrument panel or messages in a message center are sequentially illuminated indicating, first of all, that the driver should continue driving for GPF regeneration and, subsequently, under certain conditions, that the engine power has been reduced. Depending on the soot level, operation of the motor vehicle then proceeds at normal or reduced engine speed or power until, based upon time, sensed data, such as pressure drop across the filter, or previously determined experimental or empirical data, the filter has been regenerated. When the filter has been regenerated, the indicator lights or messages are extinguished and normal engine operation resumes.

Thus it is an aspect of the present disclosure to provide a method of regenerating a gas particulate filter (GPF) utilized with an internal combustion engine in a motor vehicle.

It is a further aspect of the present disclosure to provide a method of regenerating a gas particulate filter utilized with an internal combustion engine under varying operating conditions.

It is a still further aspect of the present disclosure to provide a method of regenerating a gas particulate filter utilized with an internal combustion engine which provides information about such regeneration to a motor vehicle operator.

It is a still further aspect of the present disclosure to provide a method of regenerating a gas particulate filter based upon variables such as time since last regeneration, exhaust back pressure and particulate filter differential pressure.

It is a still further aspect of the present disclosure to provide a method of regenerating a gas particulate filter that adjusts certain engine operating parameters when a GPF regeneration is required but when the GPF is not at a sufficiently high temperature to support regeneration.

It is a still further aspect of the present disclosure to provide a method of regenerating a gas particulate filter that adjusts certain engine operating parameters when a GPF regeneration is required and the GPF is at a sufficiently high temperature to support regeneration in order to efficiently burn off the particulate matter (soot) in the filter.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
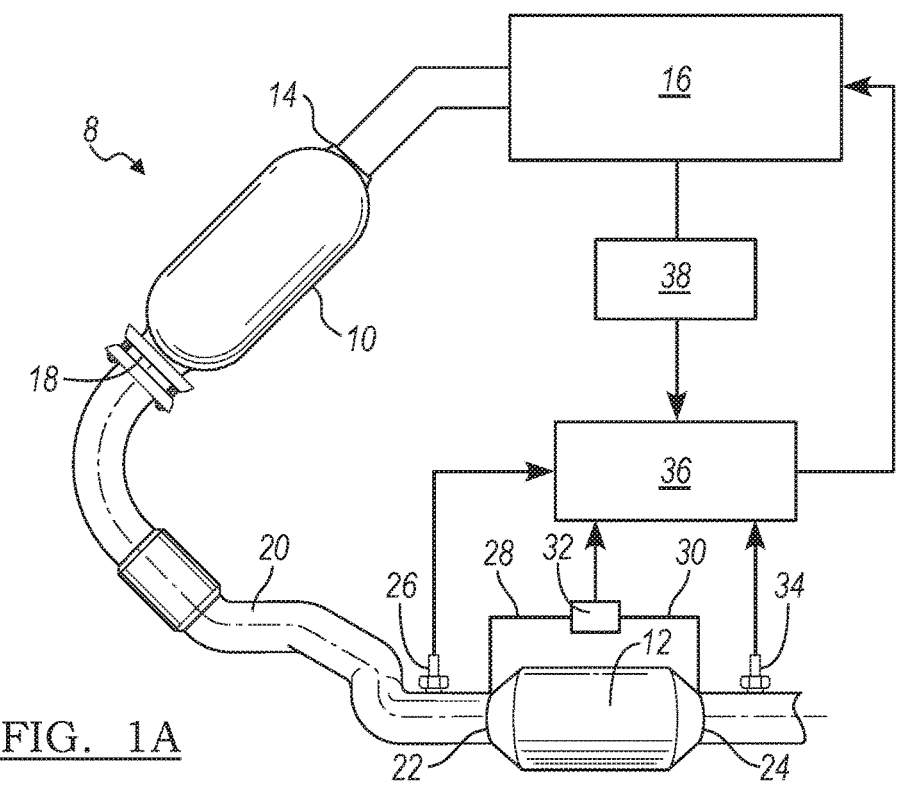
FIGS. 1A and 1B are diagrammatic views of two three way catalytic converter (TWC) and gas particulate filter (GPF) configurations which may be utilized with the present method of regeneration.

With reference to FIG. 1A, a first, under-floor system configuration 8 of a three way catalytic converter (TWC) 10 and separate gas particulate filter (GPF) 12 is illustrated. The three way catalytic converter 10, which is conventional, includes an inlet end or opening 14 which receives exhaust gasses from a gasoline fueled internal combustion engine 16 and an outlet end or opening 18 which is connected through an exhaust pipe 20 to an inlet end or opening 22 of the gas particulate filter 12. In turn, the gas particulate filter 12 has an outlet end or opening 24 which feeds the output of the particulate filter 12 to other components of the exhaust system such as mufflers, resonators and tail pipes (all not illustrated).

Upstream or ahead of the gas particulate filter 12 and disposed in the exhaust pipe 20 is a pre-GPF temperature sensor 26 which, as the name suggests, measures the temperature of the exhaust gasses entering the gas particulate filter 12. Disposed across the gas particulate filter 12, that is, with a first pressure sensing pipe or tube 28 connected to or adjacent the inlet end or opening 22 of the gas particulate filter 12 and a second pressure sensing pipe or tube 30 connected to or adjacent the outlet end or opening 24 of the gas particulate filter 12, is a differential pressure sensor 32 which senses the pressure drop of the exhaust gasses across or through the gas particulate filter 12. Downstream or after the gas particulate filter 12 is a post-GPF temperature sensor 34 which, again as the name suggests, measures the temperature of the exhaust gasses leaving the gas particulate filter 12. Data or signals from the pre-GPF temperature sensor 26, the differential pressure sensor 32 and the a post-GPF temperature sensor 34 are provided to a gas particulate filter control module 36 which may be a stand-alone electronic device such as a microprocessor with suitable input, memory, processing and output components or may be a portion or component of an engine control module (ECM) (not illustrated). Other data and signals from sensors 38, for example, a vehicle odometer, a vehicle speedometer, an engine tachometer, a coolant temperature sensor and an ambient air pressure sensor are or may be supplied to the gas particulate filter control module 36.

Figure 1B:
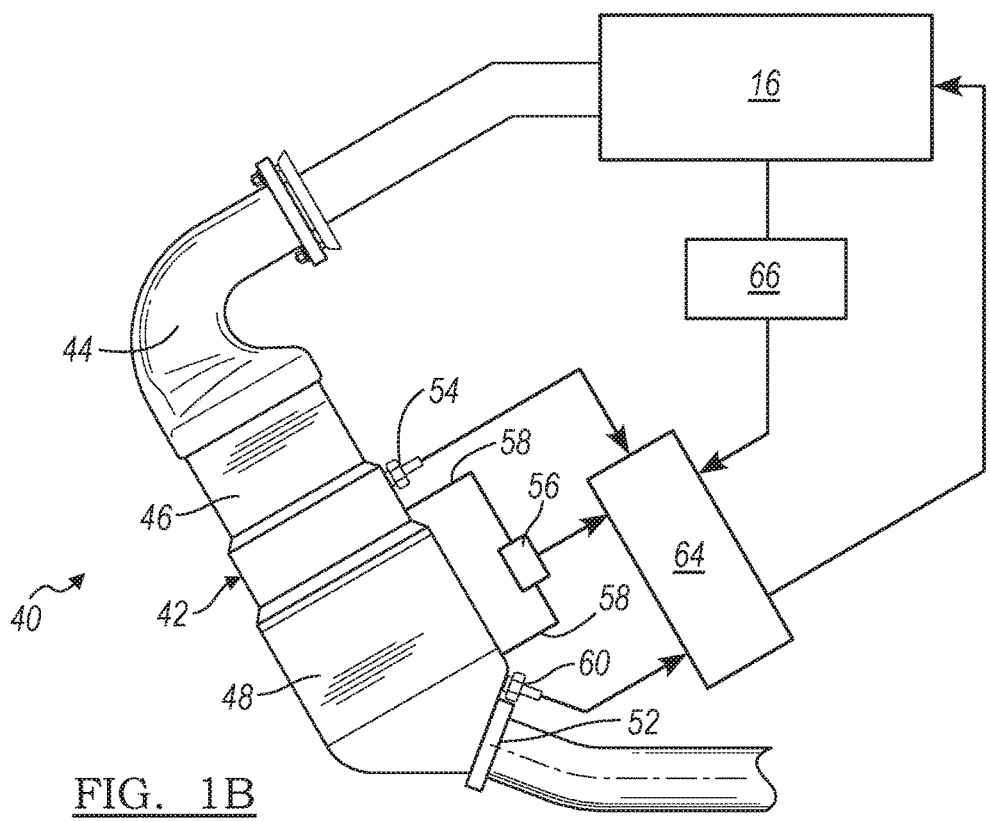

With reference to FIG. 1B, an alternate exhaust system configuration having a close coupled converter and filter assembly is illustrated and generally designated by the reference number 40. The close coupled converter and filter assembly 40 is contained in a unitary housing 42 which includes an inlet pipe or opening 44 which receives exhaust gasses from a gasoline fueled internal combustion engine 16. Adjacent the inlet opening 44, in the housing 42, is a conventional three way catalytic converter 46 through which the exhaust gasses pass. Downstream and adjacent the catalytic converter 46 within the housing 42 is a gas particulate filter 48. The unitary housing 42 also includes an outlet fitting or pipe 52 which directs the output of the close coupled converter and filter assembly 40 to other components of the exhaust system such as mufflers, resonators and tail pipes (all not illustrated).

The close coupled converter and filter assembly 40 is instrumented the same as the gas particulate filter 12. Thus, it includes a pre-GPF temperature sensor 54, a differential pressure sensor 56 having suitable inlet and outlet pressure sensing pipes or tubes 58 and a post-GPF temperature sensor 60, all of which operate in the same manner and sense the same variables as the sensors 26, 32 and 34 described above. Likewise, data or signals from these sensors are provided to a gas particulate filter control module 64 which may be a stand-alone electronic device such as a microprocessor or may be a portion or component of an engine control module (ECM) (not illustrated). Other data and signals from sensors 66, for example, a vehicle odometer, a vehicle speedometer, an engine tachometer, a coolant temperature sensor and an ambient air pressure sensor are or may be supplied to the gas particulate filter control module 64.

In addition to the first, under-floor system configuration 8 of a three way catalytic converter (TWC) 10 and separate gas particulate filter (GPF) 12 of FIG. 1A and the close coupled converter and filter assembly 40 of FIG. 1B, this disclosure also relates to a coated GPF, which is also referred to as a four way catalytic converter or device. This device includes a three way catalytic converter and its function combined and integral with a gas particulate filter.

Figure 2:
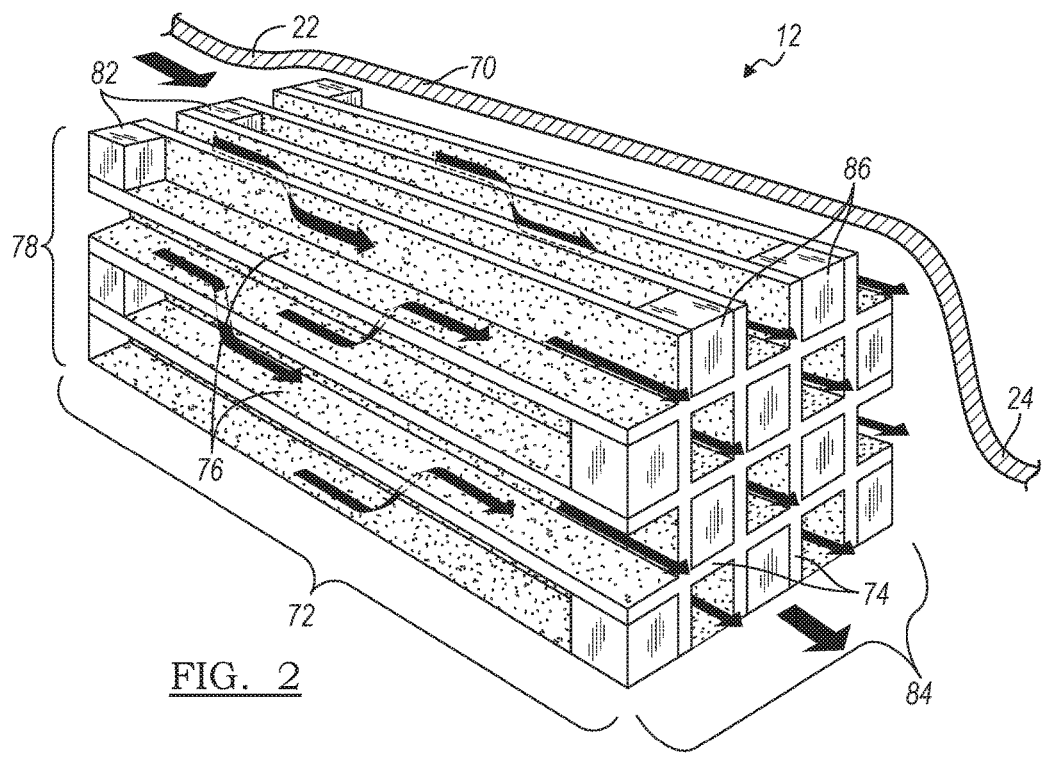
FIG. 2 is an enlarged, fragmentary view of internal structure of a typical gas particulate filter which may be utilized with the present method of regeneration.

Referring now to FIG. 2, the internal features of a typical gas particulate filter, such as the filters 12 and 48, are illustrated. For reasons of clarity and to avoid unnecessary duplication, reference numbers utilized in FIG. 2 refer to the gas particulate filter 12 of FIG. 1A. It should be understood, however, that the following description applies with equal accuracy and relevance to the gas particulate filter 48 of FIG. 1B. The particulate filter 12 includes the inlet end or opening 22 through which exhaust gasses from the internal combustion engine 16 flow into the filter 12. Similarly the particulate filter 12 includes the outlet end or opening 24 through which treated exhaust gasses flow into the remainder of the exhaust system. The inlet end 22 and the outlet end 24 are a portion of and are connected by a generally cylindrical housing 70 which receives and seals against a three dimensional filtration grid 72. The filtration grid 72 includes a framework of elongate, orthogonal panels 74 of filtration media that define preferably square, elongate passageways or channels 76. At first or inlet ends 78 of the passageways or channels 76 are disposed blocks or plugs 82 in alternation, that is, in every other first end 78 of the passageways or channels 76, that seal off the ends of the passageways or channels 76. Thus, exhaust gas enters every other passageway or channel 76. The second or outlet ends 84 of each of the passageways or channels 76 which are open at the inlet end 78 of the filter 12, that is, that do not include a block or plug 82, are closed by a block or plug 86 that seals off the outlet ends 82 of the passageways or channels 76. Each of the passageways or channels 76 that include a block or plug 82 at the inlet ends 78 are open at the outlet ends 84. Thus, exhaust gas flow that enters the open first or inlet ends 78 of the passageways or channels 76 must, and does, pass through the panels 74 of filtration media and exits the filter 12 through the open, second outlet ends 84 of the passageways or channels 76.

Figure 3:
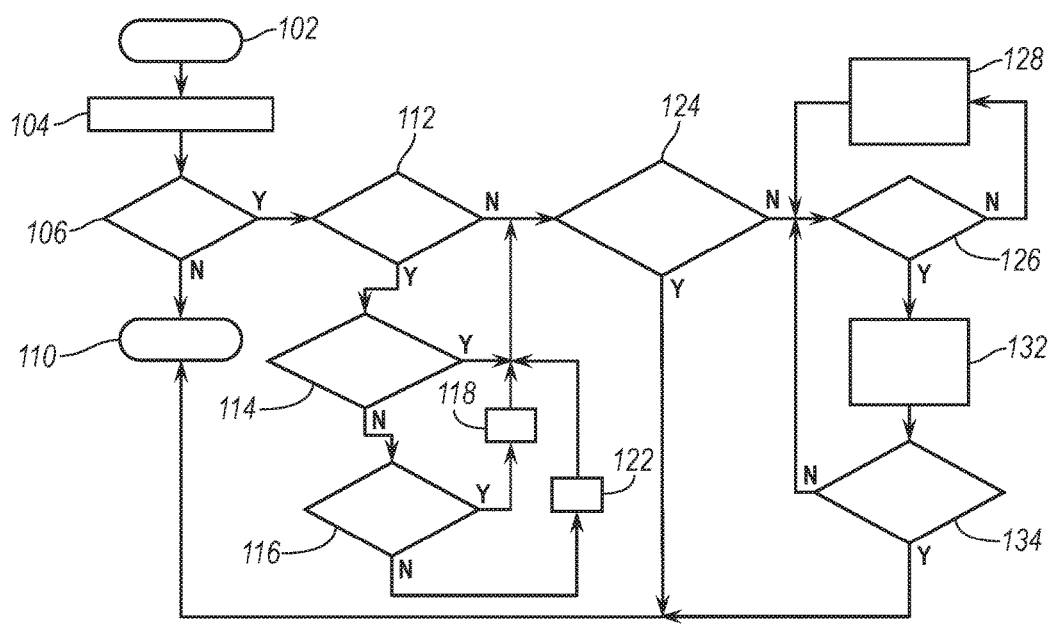
FIG. 3 is a flow chart illustrating the sequence and steps of a method of regenerating a gas particulate filter in a motor vehicle having an internal combustion gas engine according to the present method.

Referring now to FIG. 3, a flow chart illustrating the steps of a gas particulate filter regeneration method according to the present disclosure is generally designated by the reference number 100. The method 100 begins with a start or initializing step 102 which clears certain registers and begins the program or algorithm which is preferably iterative and repeated at a rate which ensures proper and timely regeneration of the vehicle's gas particulate filter and which is compatible with other vehicle and engine programs and software. The method 100 then moves to a first process step 104 which reads various vehicle and powertrain sensors such as the vehicle odometer, engine speed, the pre-GPF temperature sensor 26, and the differential pressure sensor 32 to determine the soot load. With this information, the method 100 moves to a first decision point 106 which determines, based upon these and other optional variables, whether the soot level, that is, the collected gas particulates, in the gas particulate filter 12 (and 48) has reached a level requiring regeneration. If it has not, the first decision point 106 is exited at NO and this iteration of the method 100 terminates at an end point 110. If the soot is at a level requiring regeneration, the decision point 106 is exited at YES and a second decision point 112 is encountered that inquires whether a forced regeneration is required or necessary.

A forced regeneration may be necessary, for example, if the vehicle odometer indicates that significant miles have accumulated since the last regeneration, there is significant pressure drop across the filter 12 (and 48) and/or, because of a combination of short trips or cold weather, the particulate filter 12 has not reached a sufficiently high temperature to achieve regeneration. If a forced regeneration is necessary, the second decision point 112 is exited at YES and a third decision point 114 is encountered that inquires whether the soot level is less than a predetermined value, for example, 110%. The soot level may be determined by the pressure drop indicated by the differential pressure sensor 32 or empirical operating data. If the soot level is less than 110%, the third decision point 114 is exited at YES.

If the soot level is more than 110%, the third decision point 114 is exited at NO and the method 100 moves to a fourth decision point 116 which inquires whether the soot level is greater than or equal to 110% but less than or equal to 150%. If it is, the fourth decision point 116 is exited at YES and a second process step 118 illuminates a first indicator light or provides a first message in the driver information center (DIC) stating, "Continue Driving for GPF Regeneration," or words to that effect. If this statement is not true, that is, if the soot level is greater than or equal to 150%, the fourth decision point 116 is exited at NO and a third process step 122 illuminates a second indicator light or provides a second message in the driver information center stating "Engine Power Reduced," "Engine Power Reduced During GPF Regeneration," or words to that effect.

After the second or third process steps 118 and 122 or if the second decision point 112 is exited at NO, the method 100 encounters a fifth decision point 124 which inquires whether such regeneration is being requested while the engine 16 is operating at conditions during which, for reasons of drivability or component protection, regeneration is prohibited. (See FIG. 4 and the accompanying text, below.) If it is, the regeneration process is aborted and the method 100 returns to the end point 110. If the engine 16 is not operating in a prohibited region, the fifth decision point 124 is exited at NO and a sixth decision point 126 inquires whether the gas particulate filter 12 (and 48) is at a temperature sufficiently high (on the order of 600° C.) that soot burning can be accomplished, that is, whether its temperature is above a minimum temperature. If the temperature as sensed by the pre-GPF temperature sensor 26 (and 54) is below the soot burning threshold temperature, the sixth decision point 126 is exited at NO and a fourth process step 128 is encountered the undertakes one or more, that is, a combination of actions that cause the temperature of the gas particulate filter 12 (and 48) to increase. This action typically includes, but is not limited to, retarding the spark timing, adjusting the fuel injection timing, adjusting the valve timing, inhibiting the deceleration fuel cutoff (DFCO) capability and inhibiting the engine auto start stop (ESS) feature.

As the processes of the step 128 are occurring, the method 100 returns to the sixth decision point 126 which again inquires whether the gas particulate filter 12 (and 48) is at a temperature sufficiently high that soot burning can be accomplished. If the temperature is above the soot burning threshold temperature, the sixth decision point 126 is exited at YES, and the method 100 moves to a fifth process step 132 which begins the soot burning, regeneration phase. This phase or step 132 essentially maintains operating conditions of the engine 16 that encourage rapid and complete burning of the soot (the collected gas particulates) in the filter 12 (and 48). This action typically includes, but is not limited to, undertaking one or more of the following actions: leaning the air/fuel mixture which provides increased oxygen to the filter 12 (and 48), retarding the spark timing, adjusting the fuel injection timing, adjusting the cam phaser positions to adjust the valve timing, enabling the deceleration fuel cutoff (DFCO) capability and, again, inhibiting the engine auto start stop (ESS) feature.

Finally, a seventh decision point 134 is reached which inquires whether the regeneration cycle should be terminated because the soot has been burned off. This decision is the result of several operating conditions including, most significantly a reduction to below a threshold level or value of the pressure drop across the filter 12 (and 48) as sensed by the differential pressure sensor 32 (and 56), the attainment of substantially equal inlet and outlet temperatures as sensed by the pre-GPF temperature sensor 26 (and 54) and the post-GPF temperature sensor 34 (and 60) and the passage of a pre-determined time interval. If, given the values of these, and optionally other variables, the determination is made that the soot has not been burned off, the seventh decision point 134 is exited at NO and the method 100 returns to the sixth decision point 126 to again determine if the proper soot burning temperature is being maintained in the particulate filter 12 (and 48). If the determination is made that the soot has been burned off, the seventh decision point 134 is exited at YES and the method 100 terminates at the end point 110.

It should be understood that the sequence of the process and steps of the method 100 set forth in FIG. 3 and described above is exemplary and illustrative and that the sequence may be re-ordered while still achieving the same result. For example, the fifth decision point 124 which aborts regeneration during certain operating conditions of the engine 16 may be re-located and executed before the second decision point 112 relating to forced regeneration or it may be re-located and executed before the first decision point 106 relating to regeneration.

Figure 4:
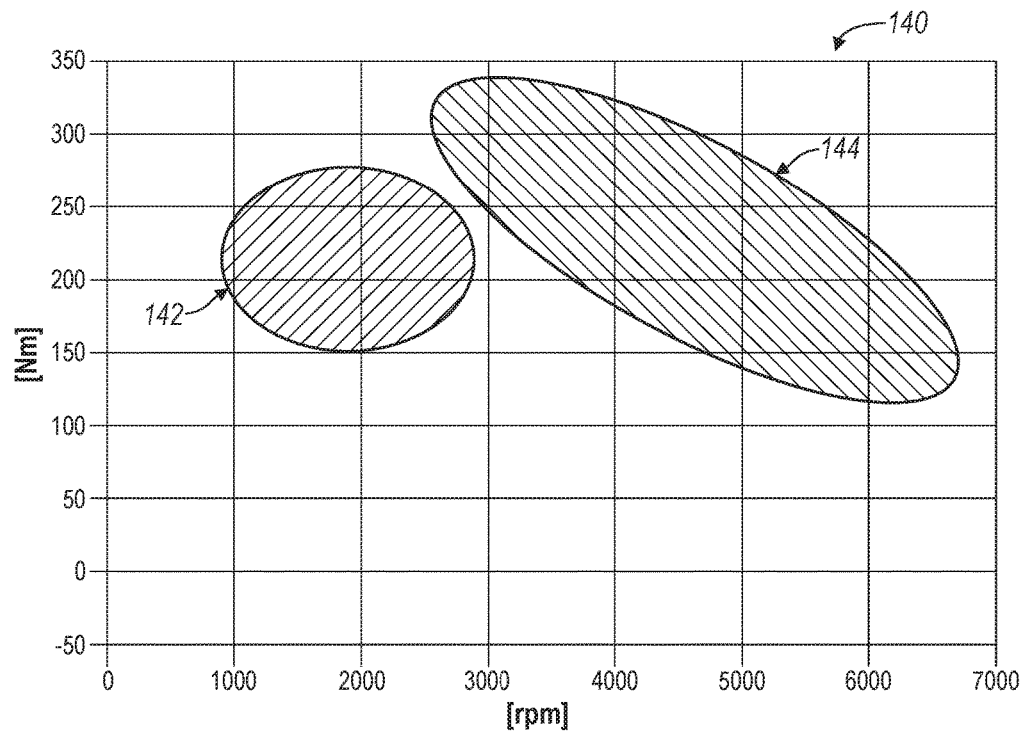
FIG. 4 is a graph or map plotting operating areas for active regeneration of a motor vehicle internal combustion gas engine particulate filter according to the present method.

Referring now to FIG. 4, a graph 140 presents a plot of engine speed along the horizontal (X) axis and brake torque along the vertical (Y) axis. It will be appreciated that adjusting the operating parameters of the engine 16 as described above may, when undertaken under certain operating conditions affect the performance of the vehicle powertrain. FIG. 4 thus presents two plotted areas or regions, one, designated 142, generally centered at 2000 r.p.m. and 220 Nm of torque and the other, designated 144, extending generally from 3000 r.p.m. and 300 Nm of torque to 6400 r.p.m. and 150 Nm of torque wherein regeneration of the gas particulate filter 12 (and 48) is prohibited. Regeneration is prohibited in the area or region 142 for drivability reasons and, in the area or region 144, it is prohibited for component protection reasons. It should be understood that the plots appearing in FIG. 4 and the above-recited values are exemplary and illustrative only and that their size and location on the graph 140 will vary with engine displacement, power, compression ratio, aspiration (natural, turbocharged or supercharged) and other variables.

Figure 5:
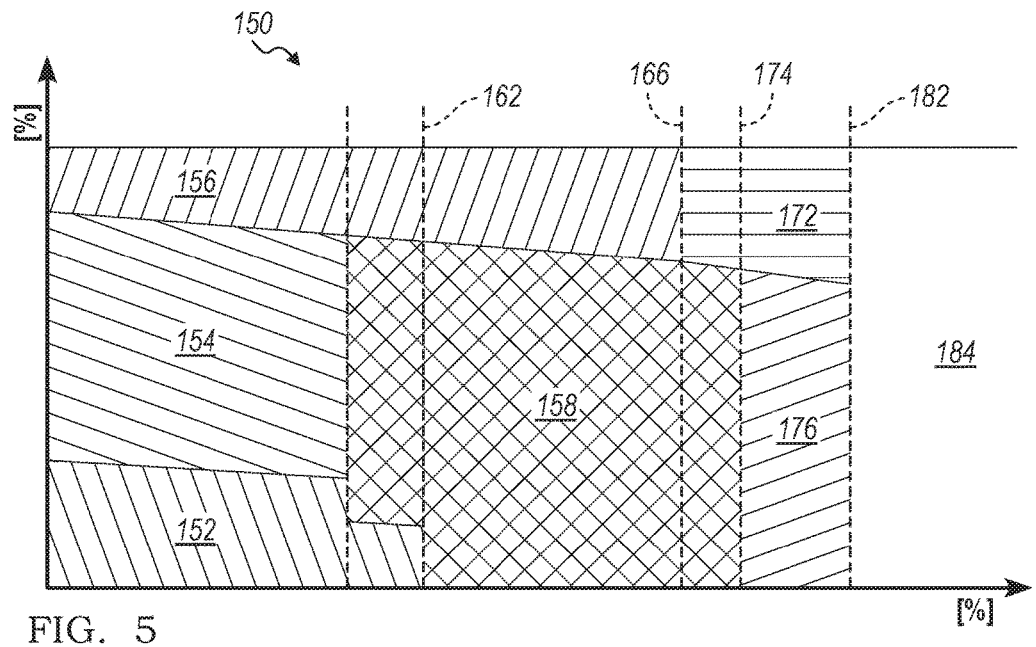
FIG. 5 is a graph or map plotting a gas particulate filter regeneration strategy for a motor vehicle internal combustion gas engine according to the present method.

Referring now to FIG. 5, the overall strategy of regeneration is illustrated in an activation map 150 which presents soot load in percent along the horizontal (X) axis and engine load in percent along the vertical (Y) axis. The activation map 150 defines several operating areas or regions including: a first operating region 152 at relatively low engine load in which the temperature of the particulate filter 12 (and 48) is insufficient to achieve soot burning; a second region 154 at higher engine load in which passive soot burning occurs, that is, soot burning which occurs simply because the operating conditions of the engine 16 generate sufficiently high temperature (above approximately 600° C.) in the particulate filter 12 (and 48) that soot burning occurs; and a third region 156 at still higher engine load corresponding to the prohibited area or region 144 of FIG. 4 in which active regeneration is prohibited.

When the soot load reaches approximately 100 percent, as determined by various sensors described above, passive, but more importantly, active regeneration accordingly to the method 100 and flow chart of FIG. 3 begins in the fourth region 158. Note that as engine load increases, and notwithstanding the need to actively regenerate the filter 12 (and 48), the third region 156 may be encountered which prohibits active regeneration. Also note that if the detected soot level reaches approximately 110 percent threshold, as indicated by the line 162, a first indicator light or message in the driver information center (DIC) will be provided that states, "Continue Driving for GPF Regeneration," or words to that effect. This is achieved by the second process step 118 described above in connection with FIG. 3.

If and when the soot load reaches approximately 150 percent, as indicated by the line 166, a second indicator light or message in the driver information center (DIC) will be provided that states, "Engine Power Reduced," "Engine Power Reduced During GPF Regeneration," or words to that effect. This is achieved by the third process step 122 described above in connection with FIG. 3. Consistent with this message, at high engine loads, in a fifth region 172, the engine power is reduced. At approximately a soot loading of 155 percent represented by the line 174, when the DTC FR is high, a sixth region 176 calls for service of the regeneration system and the filter 12 (and 48). Should the soot loading exceed approximately 170 percent, as represented by the line 182, a seventh region 184 provides an indication that the particulate filter 12 (and 48) must be replaced. This indication may be accomplished by illuminating a "Check Engine" indicator and/or providing an on-board diagnostic indication in a system such as OBD II.

The foregoing disclosure is merely exemplary in nature and variations that do not depart from the gist of the disclosure are intended to be, and are, within the scope of the disclosure. Such variations are not, and are not to be regarded, as a departure from the spirit and scope of the disclosure.

What is claimed is:

1. A method of regenerating a gas particulate filter in a motor vehicle comprising the steps of:
    determining a pressure drop through a gas particulate filter to determine a necessity of regeneration,
    determining a soot level in the gas particulate filter from the pressure drop,
    determining if a soot level in the gas particulate filter is above a first predetermined value and providing a first driver information message,
    determining if a soot level in the gas particulate filter is above a second, higher predetermined value and providing a second driver information message,
    determining a temperature of inlet gasses to the gas particulate filter, adjusting at least one of a first set of engine operating parameters if the temperature is below a threshold temperature to increase the temperature,
    adjusting a second set of engine operating parameters if the temperature is above a threshold temperature to burn particulates in the particulate filter, and
    continuing to operate under the second set of engine operating parameters until a predetermined condition is met.

2. The method of claim 1 wherein the pressure drop in the particulate filter is determined by reading and comparing pressures at an inlet and an outlet of the particulate filter.

3. The method of claim 1 wherein the first set of adjusted engine operating parameters includes retarding spark timing, adjusting fuel injection timing, adjusting valve timing, inhibiting a deceleration fuel cutoff and inhibiting an engine start-stop feature.

4. The method of claim 1 wherein the second set of adjusted engine operating parameters includes leaning an air/fuel mixture, retarding spark timing, adjusting fuel injection timing, adjusting cam phaser positions to adjust the valve timing, enabling a deceleration fuel cutoff and inhibiting an engine auto stop feature.

5. The method of claim 1 further including the step of inhibiting regeneration and operating under the second set of adjusted engine operating parameters when engine speed and load are within certain limits.

6. The method of claim 1 wherein the first driver information message is provided when the pressure drop through the gas particulate filter indicates a soot level of greater than 110 percent and the second driver information message is provided when the pressure drop through the gas particulate filter indicates a soot level of greater than 150 percent.

7. The method of claim 1 wherein the predetermined condition is one of time, temperature and pressure drop.

8. The method of claim 1 wherein the first predetermined value is 110 percent and the second predetermined value is 150 percent.

9. A method of regenerating a gas particulate filter for an internal combustion engine, comprising the steps of:
    determining if regeneration is necessary based upon one of vehicle mileage and pressure drop across the gas particulate filter,
    determining if a soot level in the gas particulate filter is above a first predetermined value and providing a first driver information message indicating gas particulate filter regeneration, determining if a soot level in the gas particulate filter is above a second, higher predetermined value and providing a second driver information message indicating reduced engine power, determining if the internal combustion engine is operating at a condition that precludes regeneration, determining if a temperature of the gas particulate filter is sufficient to promote regeneration, heating the gas particulate filter by adjusting at least one of a first set of engine operating parameters if the temperature of the gas particulate filter is insufficient to promote regeneration, and maintaining the temperature of the gas particulate filter and regenerating the gas particulate filter by adjusting a second set of engine operating parameters if the temperature of the gas particulate filter is sufficient to promote regeneration.

10. The method of claim 9 wherein the temperature of the gas particulate filter is maintained for a predetermined time to regenerate the gas particulate filter.

11. The method of claim 9 wherein the temperature of the gas particulate filter is maintained until a pressure drop across the gas particulate filter reduces to a predetermined minimum value.

12. The method of claim 9 wherein the first set of adjusted engine operating parameters includes retarding spark timing, adjusting fuel injection timing, adjusting valve timing, inhibiting a deceleration fuel cutoff and inhibiting an engine start-stop feature.

13. The method of claim 9 wherein the second set of adjusted engine operating parameters includes leaning an air/fuel mixture, retarding spark timing, adjusting fuel injection timing, adjusting cam phaser positions to adjust the valve timing, enabling a deceleration fuel cutoff and inhibiting an engine auto stop feature.

14. The method of claim 9 wherein the first driver information message is provided when the gas particulate filter has a soot level of greater than 110 percent and the second driver information message is provided when the gas particulate filter has a soot level of greater than 150 percent.

15. The method of claim 9 wherein the first predetermined value is 110 percent and the second predetermined value is 150 percent.

16. A method of regenerating a gas particulate filter for an internal combustion engine, comprising the steps of:

determining that a regeneration cycle is necessary based upon at least one of vehicle mileage and a pressure drop through the gas particulate filter, determining if a soot level in the gas particulate filter is above a first predetermined value and providing a first driver information message, determining if a soot level in the gas particulate filter is above a second, higher predetermined value and providing a second driver information message, determining if the internal combustion engine is operating at a condition that precludes regeneration, terminating the regeneration cycle if the internal combustion engine is operating at a precluding condition, determining if a temperature of the gas particulate filter is sufficient to achieve regeneration, heating the gas particulate filter by adjusting at least one of a first set of engine operating parameters if the temperature of the gas particulate filter is insufficient to achieve regeneration, and maintaining the temperature of the gas particulate filter and regenerating the gas particulate filter by adjusting a second set of engine operating parameters if the temperature of the gas particulate filter is sufficient to achieve regeneration.

17. The method of claim 16 wherein the first set of adjusted engine operating parameters includes retarding spark timing, adjusting fuel injection timing, adjusting valve timing, inhibiting a deceleration fuel cutoff and inhibiting an engine start-stop feature.

18. The method of claim 16 wherein the second set of adjusted engine operating parameters includes leaning an air/fuel mixture, retarding spark timing, adjusting fuel injection timing, adjusting cam phaser positions to adjust the valve timing, enabling a deceleration fuel cutoff and inhibiting an engine auto stop feature.

19. The method of claim 16 wherein the first driver information message is provided when the gas particulate filter has a soot level of greater than 110 percent and the second driver information message is provided when the gas particulate filter has a soot level of greater than 150 percent.

* * * * *